United States Patent
Meehan et al.

(10) Patent No.: US 11,441,393 B2
(45) Date of Patent: Sep. 13, 2022

(54) SYSTEM AND PROCESS FOR GEOLOGICAL SEQUESTRATION OF CARBON-CONTAINING MATERIALS

(71) Applicant: Charm Industrial, Inc., San Francisco, CA (US)

(72) Inventors: Shaun Meehan, San Francisco, CA (US); Kelly Hering, San Francisco, CA (US); Peter Reinhardt, San Francisco, CA (US); Daniel Fourie, San Francisco, CA (US)

(73) Assignee: Charm Industrial, Inc., San Francisco, CA (US)

( * ) Notice: Subject to any disclaimer, the term of this patent is extended or adjusted under 35 U.S.C. 154(b) by 0 days.

(21) Appl. No.: 17/319,636

(22) Filed: May 13, 2021

(65) Prior Publication Data

US 2021/0355791 A1     Nov. 18, 2021

Related U.S. Application Data (60) Provisional application No. 63/122,331, filed on Dec. 7, 2020, provisional application No. 63/024,897, filed on May 14, 2020.

(51) Int. Cl.
*E21B 41/00* (2006.01)
*B65G 5/00* (2006.01)
(Continued)

(52) U.S. Cl.
CPC .......... *E21B 41/0064* (2013.01); *B65G 5/005* (2013.01); *E21B 49/02* (2013.01); *E21B 49/087* (2013.01)

(58) Field of Classification Search
CPC .... E21B 41/0064; E21B 49/02; E21B 49/087; B65G 5/005; B65G 5/00; Y02C 20/40
See application file for complete search history.

(56) References Cited

U.S. PATENT DOCUMENTS

| | | | | |
|---|---|---|---|---|
| 4,344,770 A | * | 8/1982 | Capener | C10B 49/04 |
| | | | | 44/388 |
| 10,457,882 B2 | | 10/2019 | Brown et al. | |

(Continued)

FOREIGN PATENT DOCUMENTS

| | | | | |
|---|---|---|---|---|
| GB | 2519521 A | | 4/2015 | |
| KR | 20180025649 | * | 3/2018 | ............... F17C 7/04 |
| KR | 20180025649 A | | 3/2018 | |
| WO | WO-2015042315 A1 | * | 3/2015 | ............... C10G 1/02 |

OTHER PUBLICATIONS

"Class I Industrial and Municipal Waste Disposal Wells," U.S. Environmental Protection Agency, available at: <https://www.epa.gov/uic/class-i-industrial-and-municipal-waste-disposal-wells>, downloaded Jul. 29, 2021.

(Continued)

*Primary Examiner* — Carib A Oquendo
(74) *Attorney, Agent, or Firm* — Goodwin Procter LLP (57) ABSTRACT

This disclosure relates to a method and a system for sequestering carbon-containing materials in underground wells. An example method includes: obtaining a material comprising a carbon-containing liquid; optionally testing the material for compatibility with an underground well; optionally adjusting a property of the material to improve the compatibility; and providing the material for injection into the underground well.

20 Claims, 5 Drawing Sheets

(51) Int. Cl.
    *E21B 49/02*     (2006.01)
    *E21B 49/08*     (2006.01)

(56) References Cited

U.S. PATENT DOCUMENTS

| | | | |
|---|---|---|---|
| 10,851,037 B2 | 12/2020 | Brown et al. | |
| 2009/0220303 A1* | 9/2009 | Dickinson, III | E21B 43/305 405/55 |
| 2010/0205960 A1* | 8/2010 | McBride | F02C 6/16 60/641.2 |
| 2011/0313218 A1* | 12/2011 | Dana | B01D 1/14 585/240 |
| 2012/0017494 A1* | 1/2012 | Traynor | C10L 1/02 44/388 |
| 2012/0118586 A1* | 5/2012 | Kameyama | E21B 43/164 166/401 |
| 2013/0040349 A1* | 2/2013 | Heichberger | C11C 3/003 435/134 |
| 2013/0064604 A1* | 3/2013 | Han | E21B 41/0064 405/53 |
| 2013/0137783 A1* | 5/2013 | Kumar | C01B 3/02 422/621 |
| 2016/0138456 A1* | 5/2016 | Wattenburg | E21B 41/0064 60/694 |
| 2018/0118644 A1 | 5/2018 | Brown et al. | |

OTHER PUBLICATIONS

"Class V Wells for Injection of Non-Hazardous Fluids into or Above Underground Sources of Drinking Water," U.S. Environmental Protection Agency, available at: <https://www.epa.gov/uic/class-v-wells-injection-non-hazardous-fluids-or-above-underground-sources-drinking-water>, downloaded Jul. 29, 2021.

"Task 34: Direct Thermochemical Liquefaction," IEA Bioenergy Technology Collaboration Programme, available at: <https://task34.ieabioenergy.com/>, downloaded Jul. 29, 2021.

"UIC Class I Permit No. CA10500002: California Specialty Cheeses, Manteca, CA," U.S. Environmental Protection Agency, available at: <https://www.epa.gov/uic/uic-class-i-permit-no-ca10500002-california-specialty-cheeses-manteca-ca>, downloaded Jul. 29, 2021.

Sandalow, David, et al., "Biomass Carbon Removal and Storage (BiCRS) Roadmap," Innovation for Cool Earth Forum, Jan. 2021, 63 pages.

Schmidt, Hans-Peter, et al., "Pyrogenic Carbon Capture and Storage," GCB Bioenergy, 2019, 11:573-591.

Werner, C., et al. "Biogeochemical Potential of Biomass Pyrolysis Systems for Limiting Global Warming to 1.5 Degrees C.," Environ. Res. Lett. 13, 044036, 2018.

Inernational Search Report and Written Opinion for International Patent Application No. PCT/US2021/032233, dated May 13, 2021 (14 pages).

\* cited by examiner

SYSTEM AND PROCESS FOR GEOLOGICAL SEQUESTRATION OF CARBON-CONTAINING MATERIALS

CROSS-REFERENCE TO RELATED APPLICATIONS

This application claims priority to and benefit of U.S. Provisional Application No. 63/122,331, filed on Dec. 7, 2020, and U.S. Provisional Application No. 63/024,897, filed on May 14, 2020, the entire disclosure of each of which is hereby incorporated by reference.

TECHNICAL FIELD

The present disclosure relates to the field of atmospheric carbon removal and negative carbon dioxide emissions and, more specifically, to a system and process for geological sequestration of carbon-containing materials.

BACKGROUND

The burning of fossil fuels by humans has increased atmospheric carbon dioxide concentration from an average of 280 ppm in the 19th century to 415 ppm in May of 2019. This is now believed to be contributing to substantial global climate change. Many efforts are underway globally to reduce reliance on fossil fuels and develop alternative sources of energy. There is increasing consensus, however, that anthropomorphic carbon needs to be removed from the atmosphere in order to limit associated increases in global temperatures.

Biomass is a sink of atmospheric carbon. Existing biomass carbon sequestration projects convert biomass to a sequesterable solid (e.g., biochar plowed into fields) or a sequesterable gas (e.g., $CO_2$ in underground geological formations). The permanence of carbon sequestered in soil remains a field of active study. A new category has been developed for this field and is referred to as Biomass Carbon Removal and Storage (BiCRS).

The injection of $CO_2$ into underground geological formations, while addressing concerns of storage on geological timescales, is also commonly used for enhanced oil recovery. $CO_2$ geological storage is generally expensive due to high energy costs associated with gas separation, compression, transportation, and monitoring.

There is a need for improved systems and methods for carbon sequestration and reduced $CO_2$ emissions.

SUMMARY

In certain examples, this disclosure relates to systems and methods for storing carbon-containing liquids and/or other carbon-containing materials in underground wells. The carbon-containing liquids can be produced using a variety of chemical processes, including, for example, pyrolysis, hydrothermal liquefaction, transesterification, and fermentation. The carbon-containing liquids can be or include, for example, bio-oil, biocrude, glycerol, biodiesel, ethanol, other carbon-containing materials, a suspension of carbon-containing particles (e.g., biochar particles and/or biomass particles), or any combination thereof. The carbon-containing liquids can be tested to ensure compatibility with one or more underground wells. One or more properties (e.g., pH, solids content, viscosity, etc.) of the carbon-containing liquids can be modified to improve the compatibility with an underground well, if needed. Finally, the carbon-containing liquids can be injected into underground wells for sequestration.

The systems and methods described herein for sequestration of carbon-containing liquids have several important advantages over previous carbon sequestration approaches. For example, infrastructure for manufacture, transport, and emplacement are all drastically reduced or simplified for carbon-containing liquids, compared to previous sequestration approaches involving carbon-containing gases (e.g., $CO_2$) or solids. The liquid injectant can be pumped, stored, and moved using standard hardware similar to equipment used in the oil and gas industry. Additionally, unlike gaseous injectants such as $CO_2$, liquid injectants generally do not require compression. This can avoid or significantly reduce capital and operational costs associated with compression processes and equipment. Liquid injectants are also more reliable to handle, pump, and/or convey, compared to solid injectants such as soil or bio-char. As described herein, in some cases, the liquid injectants can be mixed with solids to achieve a mixed injection of liquids and solids into a well, using conventional pumps.

In general, in one aspect, the subject matter of this disclosure relates to a method of sequestering a carbon-containing liquid. The method includes: obtaining a material including a carbon-containing liquid, wherein a property of the material has been adjusted to improve compatibility with an underground well; and providing the material for injection into the underground well.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, "biomass" is or includes an organic material that is derived from living organisms such as plants or animals. Biomass can be or include, for example, agricultural waste (e.g., corn stover), forestry residue (e.g., branches, leaves, etc.), woody biomass (e.g., trees, shrubs, bushes, etc.), non-woody biomass (e.g., sugar cane, cereal straw, seaweed, algae, cotton, grass, kelp, soil, etc.), and/or processed waste (e.g., cereal husks and cobs, bagasse, nut shells, plant oil cake, sawmill waste, food waste, human waste, animal waste, animal fats, etc.).

In various examples, a "carbon-containing material" can be or include a solid, liquid, or gas having one or more carbon atoms. Some carbon-containing materials can be referred to herein as being "biogenic." Such biogenic carbon-containing materials can be produced directly by living organisms (e.g., biomass such as wood, grass, or animal fat) or can be derived from materials produced by the living organisms (e.g., biochar, biocrude, glycerol, or gasoline), as described herein.

In various examples, a "carbon-containing liquid" can be or include a liquid having one or more carbon-containing materials, including carbon-containing materials that are liquids or solids (e.g., solid particles suspended in the liquid). Carbon-containing liquids can include, for example, bio-oil, glycerol, biodiesel, ethanol, other alcohols, used cooking oils, vegetable oil, plant-based oils, solutions containing microbes or algae, biocrude, biocrude byproducts, dispersions of biomass particles and/or biochar particles in water or other liquid, and/or fuels such as petroleum, crude oil, gasoline, kerosene, or diesel. In certain implementations, the carbon-containing liquids described herein are liquid at or around atmospheric pressure and/or at temperatures ranging from about −20° C. to about 50° C., more typically from about 10° C. to about 25° C., or at other ambient temperatures in and around well injection sites. The carbon-containing liquid is generally a liquid at normal atmospheric temperature and pressure and does not require a phase change from a gaseous form (e.g., prior to or during injection into a well).

In various examples, an underground "well" (alternatively referred to as an "injection well") can be or include an underground formation, cavern, mine, cave, or other space beneath the surface of the Earth that can receive a material for sequestration or storage. Underground wells can include, for example, salt-caverns, natural caverns, mines (e.g., abandoned mines and/or solution mines), porous rock formations, commercial disposal wells, and injection wells or caverns classified by the U.S. Environmental Protection Agency (EPA) as being Class I, Class II, Class III, Class V, or Class VI.

Figure 1:
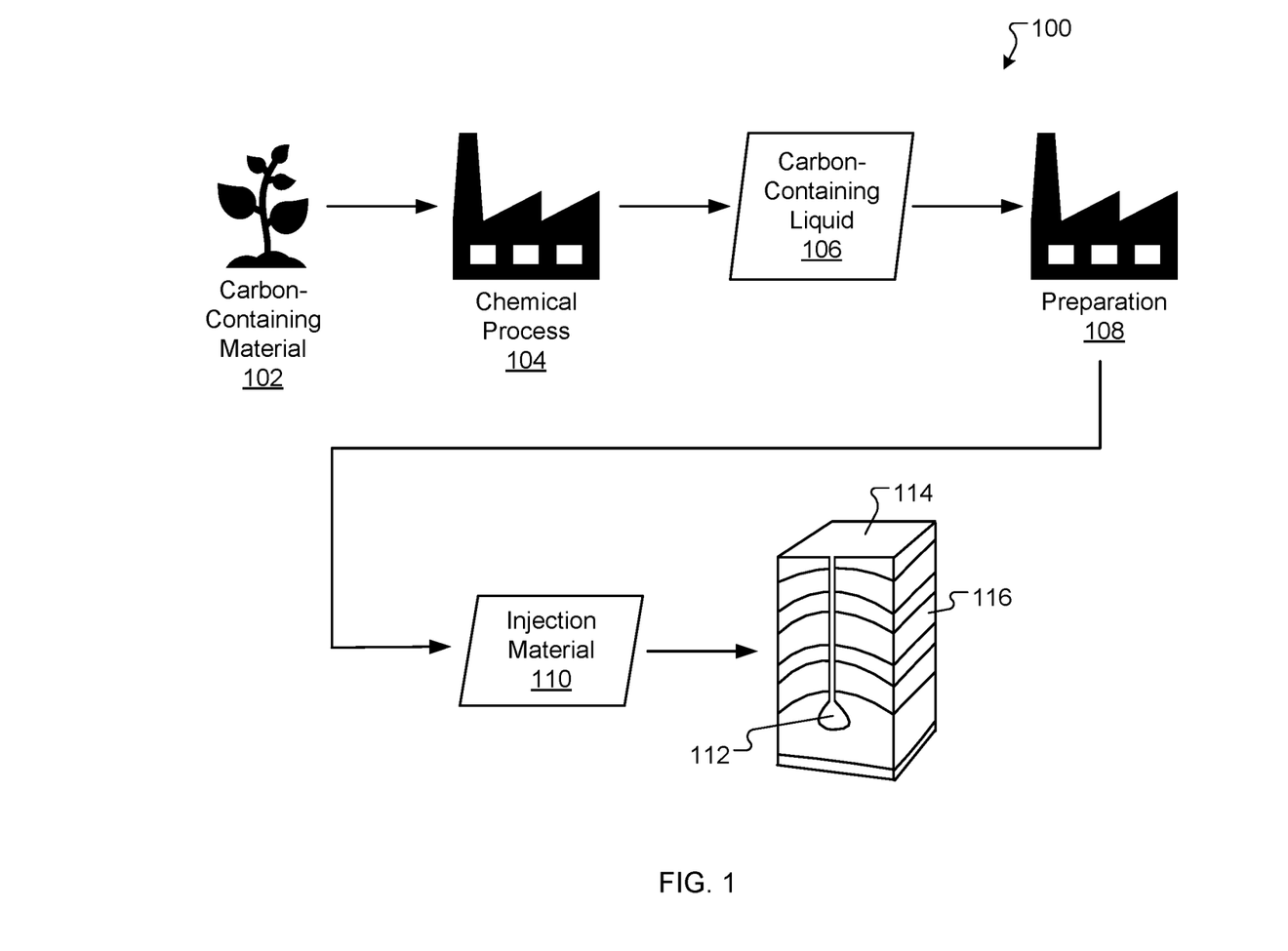
FIG. 1 is a schematic diagram of a system for forming and sequestering carbon-containing materials, in accordance with certain embodiments.

FIG. 1 is a schematic diagram of a system 100 for forming and sequestering carbon-containing materials (e.g., to achieve negative carbon emissions), in accordance with certain examples. The system 100 includes a source of carbon-containing material 102 such as, for example, a biomass (e.g., agricultural waste and/or forestry residue). The carbon-containing material 102 can be subjected to a chemical process 104 to produce a carbon-containing liquid 106. The carbon-containing liquid 106 can be subjected to a preparation process 108 in which the carbon-containing liquid 106 is tested for compatibility with sequestration in an underground well. If the carbon-containing liquid 106 is determined to be incompatible with the underground well, one or more properties of the carbon-containing liquid 106 can be modified to improve the compatibility. The carbon-containing liquid 106 or the modified carbon-containing liquid 106 can then be used as an injection material 110, which can be injected into a deep, underground well 112 (e.g., hundreds or thousands of meters beneath the surface of the Earth). The underground well 112 can be or include, for example, a salt cavern or an abandoned mine. In the depicted example, the underground well 112 is located below a parcel of land 114 and underneath several layers 116 of ground, rock, sediment, or other confining formations.

In various examples, the chemical process 104 can utilize or include a variety of techniques for producing the carbon-containing liquid 106 from the carbon-containing material 102. The chemical process can be or include, for example: fast pyrolysis to produce bio-oil and/or biochar from biomass; transesterification to produce crude glycerol and biodiesel; hydrothermal liquefaction to produce biocrude and its aqueous byproduct; fermentation to produce dilute ethanol; mechanical or solvent extraction to produce plant oils such as soybean or canola oil; and/or a process that produces biomass mixed or suspended in solution. In some examples, the carbon-containing liquid 106 or portions thereof can be obtained (e.g., purchased) without performing the chemical process 104. For example, an entity that prepares the injection material 110 or injects the injection material 110 into the underground well 112 can acquire cooking oils, one or more fuels (e.g., petroleum, gasoline, diesel, and/or crude oil), or other carbon-containing liquids 106, without using the chemical process 104 to derive such liquids.

For purposes of carbon accounting (e.g., with low-carbon fuel standard or LCFS), the system 100 and related methods can be used and accounted for in conjunction with production of a fuel, such as biocrude or hydrogen, with the fuel's carbon intensity taking into consideration a carbon negative impact of the system 100 and methods. Additionally or alternatively, the system 100 and methods can be used and accounted for as voluntary negative emissions or voluntary offsets. In some examples, the system 100 and methods can be recognized officially for cap and trade or federal and/or state carbon credits, such as a tax credit (e.g., 45Q) and/or based on LCFS carbon accounting. The system 100 and methods can be used in some instances for enhanced oil recovery and/or can be a replacement for $CO_2$ geological sequestration. Advantageously, the system 100 can provide a complete process for producing, analyzing, preparing, and injecting carbon-containing liquids for the purpose of geological sequestration of carbon from the atmosphere.

Carbon-Containing Liquid Production

Figure 2:
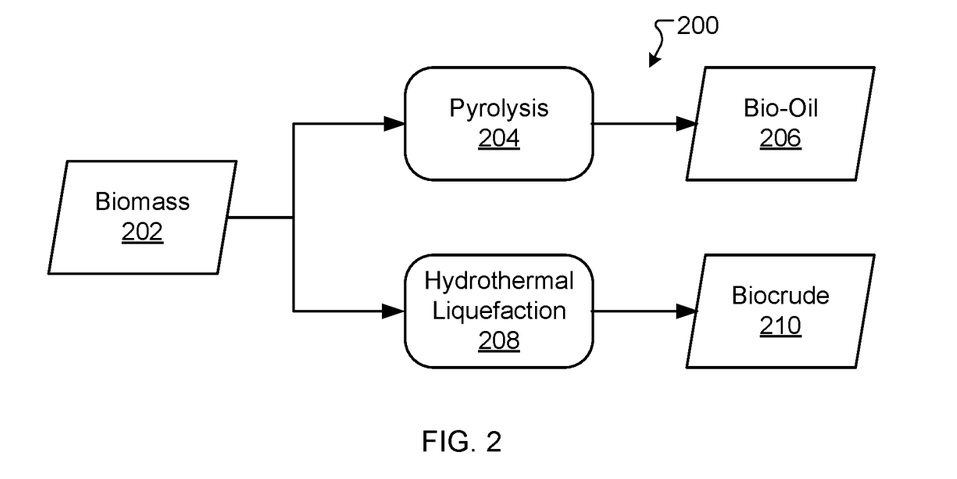
FIG. 2 is a schematic diagram of a system for preparing a carbon-containing liquid from a biomass, in accordance with certain embodiments.

FIG. 2 is a schematic diagram of a system 200 for preparing a carbon-containing liquid from a biomass 202, in accordance with certain embodiments. In one example, a pyrolysis process 204 is used to produce a bio-oil 206 from the biomass 202. The pyrolysis process 204 can use a variety of pyrolysis techniques to produce bio-oil and/or biochar (e.g., at a range of 400° C. to 800° C.), with a range of heating rates and residence times from less than a second to many minutes. In some examples, a highest yield of bio-oil can be achieved using a fast or flash pyrolysis technique. The fast pyrolysis process can involve heating the feedstock biomass 202 to roughly 500° C. at an extremely high heating rate (e.g., from about 20° C. to about 500° C. in less than 1 second, 10 seconds, or 1 minute). Alternatively or additionally, a slow or intermediate pyrolysis process can be used. Compared to fast pyrolysis, the slow or intermediate pyrolysis process can have a slower heating rate and/or a wider temperature range (e.g., for a final temperature) and, in some examples, can result in a lower yield of bio-oil. The resulting bio-oil 206 can have properties similar to those of crude oil removed from geological formations after many millions of years. The bio-oil 206, however, can be heavily oxygenated compared to crude oil (e.g., typically 30-40% oxygen for the bio-oil 206 on a dry weight basis, compared to 1% oxygen for crude oil). This can make the bio-oil 206 less valuable as a fuel or chemical, but the bio-oil 206 can still be carbon-rich for sequestration (e.g., typically 40-60% carbon on a dry weight basis). The pyrolysis process 204 can utilize fast pyrolysis equipment and/or systems used by and/or available from ENSYN or ABRI-TECH in Canada, BTG in the Netherlands, or IOWA STATE UNIVERSITY, CHARM INDUSTRIAL, FRONTLINE BIOENERGY, or MAINSTREAM ENGINEERING in the United States. Methods of performing pyrolysis of biomass are described in U.S. Pat. No. 10,457,882, issued Oct. 29, 2019, and in U.S. Pat. No. 10,851,037, issued Dec. 1, 2020, the entire disclosures of which are incorporated by reference herein.

In another example, a hydrothermal liquefaction process 208 is used to produce a biocrude 210 from the biomass 202. The hydrothermal liquefaction process 208 can be or include a thermochemical conversion process that converts the biomass 202 and water into the biocrude 210 (an oil component), an aqueous byproduct, a solid hydrochar byproduct, and a syngas mixture that is typically at least 90% $CO_2$. The biomass 202 can be a ground biomass with a variety of moisture contents. The hydrothermal liquefaction process 208 can be performed in a reactor using sub-critical or supercritical water, for example, at 300° C. to 350° C. and about 3000 psi. The residence time in the reactor is typically on the order of minutes. The biocrude 210 and the byproducts can be upgraded into sustainable jet, road, or marine fuels; however, this can be cost-prohibitive depending on the quality of the biocrude 210. The hydrothermal liquefaction process 208 can utilize hydrothermal liquefaction equipment and/or systems used by and/or available from PACIFIC NORTHWEST NATIONAL LABORATORY or GENIFUEL in the United States, STEEPER ENERGY in Denmark and Canada, LICELLA in Australia, or ALTACA ENERGY in Turkey.

Figure 3:
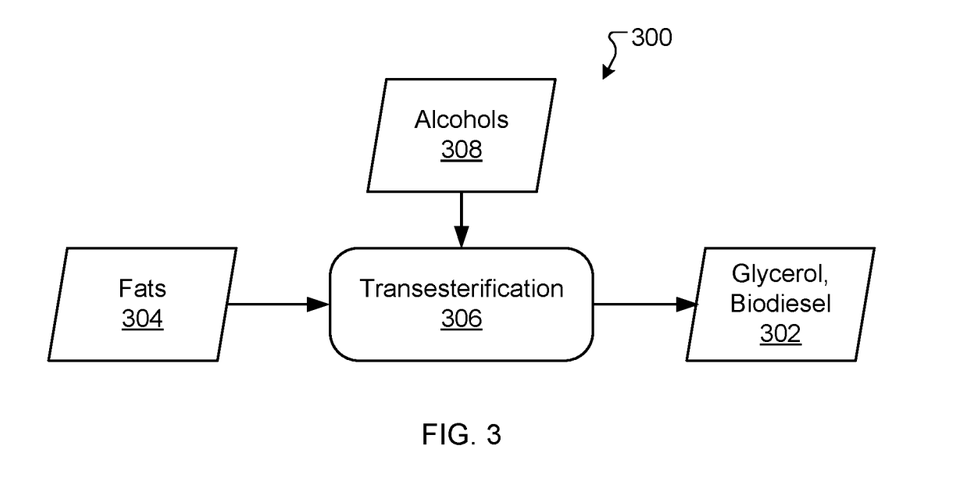
FIG. 3 is a schematic diagram of a system for producing biodiesel and glycerol from one or more fats and alcohols in a transesterification process, in accordance with certain embodiments.

Referring to FIG. 3, in some examples, a system 300 can be used to produce biodiesel and glycerol 302 (or other carbon-containing liquids) from one or more fats 304 in a transesterification process 306. The transesterification process 306 can involve a reaction in which the fats 304 react with one or more alcohols 308 in the presence of a catalyst to produce the biodiesel and glycerol 302. The fats 304 can be derived from agricultural waste, vegetable oils, used cooking oils, or from animal origin. In some examples, glycerol can be refined further to produce food grade consumer products, incinerated, or provided to cows or other livestock as a feed supplement. The transesterification process 306 can utilize equipment and/or systems used by and/or available from CARGILL Inc. and/or AG PROCESSING Inc., which are both based in the United States.

Figure 4A:
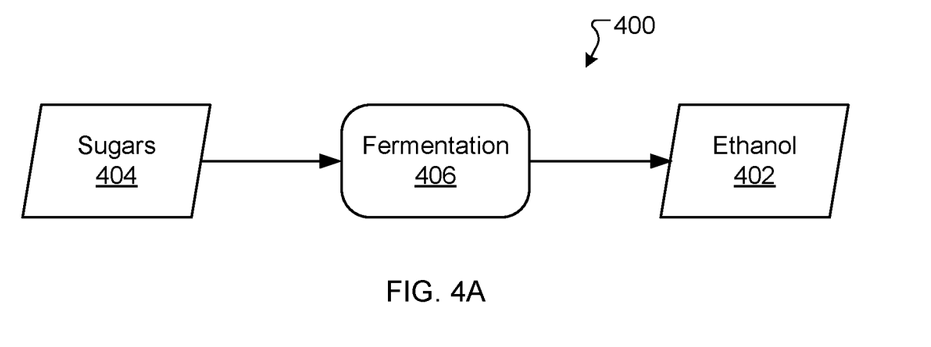
FIG. 4A is a schematic diagram of a system for producing ethanol from one or more sugars in a fermentation process, in accordance with certain embodiments.

Referring to FIG. 4A, in some examples, a system 400 can be used to produce ethanol 402 (or other alcohols or carbon-containing liquids) from one or more sugars 404 (e.g., cellulosic biomass-derived sugars, direct biogenic sugars, or other carbohydrates) in a fermentation process 406 in which bacteria consume the sugars 404 and excrete the ethanol 402 in dilute form (e.g., an ethanol and water mixture). The ethanol 402 can be distilled and dehydrated to lower water concentrations (e.g., about 0 to 5% water); however, in a typical example, the distillation and/or dehydration steps can be reduced or eliminated to reduce production costs. In some instances, for example, the ethanol 402 can have an ethanol concentration that is less than or equal to 24% (e.g., more than 76% water). Solutions having ethanol concentrations greater than 24% may be considered hazardous waste. The fermentation process 406 can utilize equipment and/or systems used by and/or available from ARCHER DANIEL MIDLAND Co., CARGILL Inc., or MARQUIS ENERGY LLC, each of which is based in the United States.

Figure 4B:
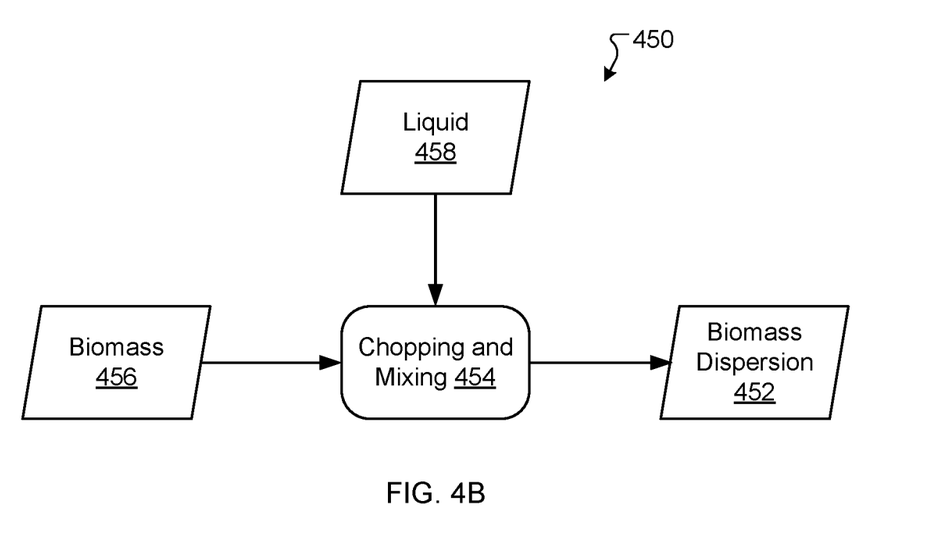
FIG. 4B is a schematic diagram of a system for producing a dispersion of biomass particles and/or biochar particles in a liquid, in accordance with certain embodiments.

Referring to FIG. 4B, in certain examples, a system 450 can be used to produce a carbon-containing liquid that is or includes a biomass dispersion 452 in which biomass particles and/or particles of biochar (e.g., produced from pyrolysis or hydrothermal liquefaction) are mixed or suspended in a liquid. A chopping and mixing process 454 can be used to chop a biomass 456 and/or biochar into small particles and then mix the particles with a liquid 458 to form the biomass dispersion 452. The chopping and mixing process 454 can utilize one or more mechanical devices to form the particles, such as a chopper, a shredder, and/or a grinder. The particle sizes (e.g., diameters) can be, for example, less than about 200 mm, less than about 50 mm, less than about 2 mm, or less than about 0.1 mm, on average or maximum. In some instances, the particle sizes can depend on the type of well that will be used for sequestration. For a Class V well or a salt cavern, for example, the particle sizes (average or maximum) can be up to 200 mm or, in certain examples, can range from about 2 mm to about 50 mm. Particle sizes for a Class I well or a Class II well can be less than about 0.1 mm. In general, smaller particle sizes can result in a biomass dispersion 452 that is easier to pump and/or less likely to clog pumping equipment. It is desirable for particle sizes to be small enough to fit in a well bore and/or subsurface pores.

In general, the chopping and mixing process 454 can form biomass particles without altering a chemical composition of the original biomass 456. For example, the biomass particles can have the same or similar chemical composition as the original biomass 456. A variety of mixing devices (e.g., including tanks and stirring devices) can be used to mix the particles with the liquid 458, which can be or include, for example, water, a carbon-containing liquid (e.g., bio-oil or glycerol), and/or other suitable liquid. One or more surfactants can be added to promote dispersion stability. Additionally or alternatively, a biocide can be added to prevent or limit microbial growth. The biocide can be added during an adjustment step, as described herein, to improve compatibility with an underground well. In some examples, the biomass dispersion 452 can include particles of biochar in addition to or instead of the biomass particles.

In various examples, a wide variety of biomass sources (e.g., the biomass 202 or the biomass 456) can be used to produce the carbon-containing liquids described herein. The biomass sources can be or include, for example, waste sawdust (e.g., that would otherwise rot) and/or waste agricultural residue (e.g., from an immediate vicinity of a fast pyrolysis plant). In the United States, corn stover (e.g., corn leaves, stalks, and cobs) is an example of a large-scale agricultural waste product that has little value. Rice straw and sugar cane bagasse are similarly low-value waste products in other countries. Such waste products are commonly burned in the field, allowed to rot, or can be used as animal bedding. These three crops alone yield 1.7 gigatons per year of waste biomass, with rice straw at 580 metric megatons per year (e.g., 3.7 tons/ha over 158 million ha), bagasse at 300 metric megatons per year, and corn stover at 860 metric megatons per year (e.g., 43 billion bushels at 2 tons recoverable/100 bushels).

A variety of other biomass sources or waste materials can be used to generate the carbon-containing liquids described herein. For example, the biomass source can be or include materials from forest thinning or powerline maintenance operations. Additionally or alternatively, certain chemical processes may use only a portion of the biomass in their specific processes and can end up with less useful byproducts that can be used as biomass sources. For example, paper mills produce a lignin pulp that can be used as a biomass source. In another example, STORA ENSO, a Louisiana company, utilizes a process that takes in raw sugarcane bagasse and produces a cooked bagasse byproduct that can be used as a biomass source that is rich in cellulose and lignin but void of hemicellulose.

Another option for the biomass source or feedstock is to plant or procure biomass used for remediation of soil (e.g., at U.S. Superfund sites) that may be high in heavily regulated toxic metals. Such waste can be difficult to dispose of, but conversion to biogenic carbon-containing liquids containing the heavily regulated toxic metals followed by injection into deep underground hazardous waste disposal wells, as described herein, may be an efficient and effective remediation method, particularly given that deep well injection can have special permitting allowances for Superfund site waste. Additionally or alternatively, the systems and methods described herein can use biomass that is grown for the purpose of being converted into a material for sequestration. Examples of such biomass materials can include energy crops such as Giant King Grass or other fast growing biomass.

Preparation for Injection

The carbon-containing liquids (e.g., the carbon-containing liquid 106) produced or obtained using the techniques described herein (e.g., fast pyrolysis, transesterification, fermentation, or hydrothermal liquefaction) can have one or more properties that are undesirable or incompatible with underground injection. Such properties can include, for example: a low pH (e.g., in the range of 1.5 to 5.5) that can be corrosive to equipment, well casings, and some rock formations; significant particulate content that can block pore space and/or cause instability in storage and transport; high viscosity or a tendency to auto-polymerize which can require high injection pressures or clog injection wells; a low flash point (e.g., below 60° C.) which can present a fire or explosion hazard; a high specific gravity (e.g., greater than 1.2) that can exceed the density limit for some well providers; and/or a potential for microbial growth or interaction. In some examples, microbial growth or interaction can be problematic due to potential gas-generating reactions that can release carbon dioxide, methane, or other gaseous products. Such reactions can increase pressure in the well, which can cause leakage from the well and/or affect an end permanence of the carbon sequestration.

Figure 5:
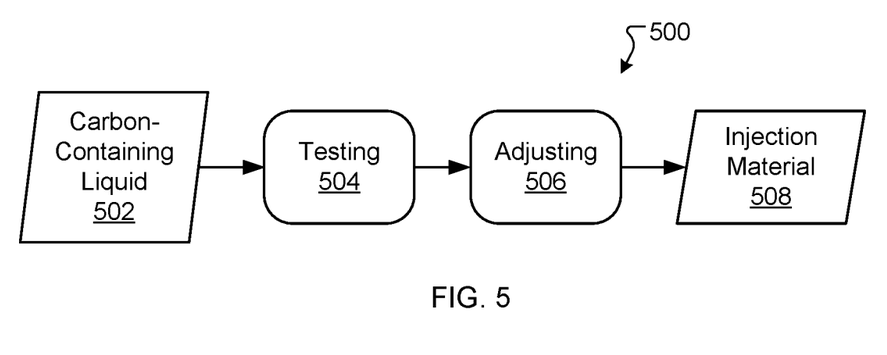
FIG. 5 is a schematic diagram of a process for testing and/or adjusting a carbon-containing liquid, in accordance with certain embodiments.

Referring to FIG. 5, in some examples, a method 500 is used to test and/or adjust one or more properties of a carbon-containing liquid 502 prior to underground injection. For example, a variety of tests (step 504) can be performed on the carbon-containing liquid 502 to confirm that the carbon-containing liquid 502 is suitable for underground injection and/or compatible with a particular underground well. A series of lab tests can be performed, for example, to check for compatibility with various well types. In some instances, the tests can be used to measure or determine pH, corrosivity, particulate/solids content, viscosity, tendency to auto-polymerize, flash point, density or specific gravity, a potential for microbial growth (e.g., presence of sugars), a total carbon content (e.g., to verify carbon sequestered), and/or heavy metals content. In some instances, a toxicity characteristic leaching procedure (e.g., SW-846 Test Method 1311 defined by the Environmental Protection Agency) can be performed to determine a mobility of analytes present in solid, liquid, or multiphase waste materials. Tendency to auto-polymerize can be detected by measuring an increase in viscosity and/or diametral growth of any suspended solids or micelles. Tests for polymerization may be required or beneficial, for example, when the carbon-containing liquid 502 is (i) mixed with other solutions or substances, (ii) stored for long periods of time (e.g., greater than one month), and/or (iii) heated to temperatures above 100° C. (e.g., prior to or during injection into a well). Microbial growth potential can be evaluated using a portable microbiology media test kit (e.g., sold by INTERTEK).

Additionally or alternatively, a test of the carbon-containing liquid 502 can be performed using a core sample of the underground formation, to ensure compatibility. Such testing can be used to confirm that the carbon-containing liquid 502 will not plug pore space, cause gas generating reactions, damage the formation, or produce undesirable reactions with formation materials. In some instances, the carbon-containing liquid 502 can be tested in a mixture with down-well substrates, liquids, or other well materials to ensure the carbon-containing liquid 502 is compatible with such materials. This can avoid potential issues related to premature polymerization, auto-polymerization, phase separation, gas generation, and/or precipitation of solids.

Still referring to FIG. 5, one or more properties of the carbon-containing liquid 502 can be adjusted (step 506), if desired, to produce an injection material 508 for injection into an underground well. In general, the injection material 508 can be or include a modified version of the carbon-containing liquid 502. One or more tests (e.g., as described above for step 504) can be performed on the injection material 508 prior to the injection process.

In some instances, for example, the injection material 508 can be produced by adding one or more pH modifiers to the carbon-containing liquid 502 to adjust the pH to a desired level (e.g., greater than 2, 3, 4, or 5), depending on the specific well or underground formation. The pH modifiers can be or include, for example, diluents (e.g., water), buffers, or blending additives, such as vegetable oil, sunflower oil, caustic materials, or processed materials such as molasses or petrochemical products.

Additionally or alternatively, the injection material 508 can be produced by decreasing the viscosity of the carbon-containing liquid 502 to a practical level for pumping or storage through the use of pre-heating or dilution. One or more of the pH modifiers, described above, can be added to achieve reduced viscosity through dilution, in some examples. A desired or target viscosity for the injection material 508 can depend on specific well geology, for example, with some injection wells being able to accept highly viscous materials, such as bitumen. Less viscous injection materials 508 can be obtained by blending the carbon-containing liquid 502 with water, a lower viscosity oil, and/or a solvent, such as methanol or other alcohol.

In some examples, the injection material 508 can be produced by adding polymerization inhibitors or polymerization accelerators to the carbon-containing liquid 502, depending on characteristics of the target well. Polymerization inhibitors such as hydroquinone can be added for wells where polymerization is not desirable. For wells where auto-polymerization can be beneficial (e.g., to help stabilize an underground cavern), biochar or ash products can be added to the carbon-containing liquid 502 to increase a rate of polymerization. Possible polymerization reactions involving the carbon-containing liquid 502 can include, for example, a homopolymerization reaction of aldehydes, a condensation reaction of furfuryl alcohols and/or other furan derivatives, and polymerization of olefins (e.g., in presence of free radicals from peroxides in the carbon-containing liquid 502).

Additionally or alternatively, in some instances, the temperature may need to be adjusted to maintain a stability of the injection material 508 and/or to achieve desired material properties or flow characteristics at the time of pumping or injection. For bio-oil, for example, a temperature of about 40° C. can be targeted for injection, to maintain a lower viscosity and/or avoid polymerization or accelerated polymerization. For some injection materials 508, such as glycerol, little or no temperature modification or control may be needed.

In some examples, the adjusting step 506 can involve use of mechanical agitation, for example, to blend layers caused by phase separation, decrease overall viscosity, and/or blend high viscosity materials (e.g., oils) with low viscosity materials. A variety of mechanical mixers (e.g., available from JONGIA) can be used. Mechanical agitation can occur within a train tank car, a tanker trailer, and/or a storage tank (e.g., near an injection site). Additionally or alternatively, mechanical agitation can be used to blend in additives, such as water (e.g., for reducing specific gravity of the bulk liquid), other carbon-containing liquids and solids (e.g., for increased carbon content), and/or a biocide to reduce or eliminate microbial production, growth, or interactions.

In various implementations, the adjusting step 506 can involve increasing the flash point of the injection material 508 (e.g., to be above 60° C.). The flash point can be increased using distillation (e.g., partial or vacuum distillation) and/or blending with non-volatile or high flash point liquids, such as, for example, vegetable oil, sunflower oil, or water. Partial or vacuum distillation equipment and systems are available from KOCH MODULAR.

To reduce solids loading, the adjusting step 506 can utilize or include a filtration or separation process, such as mechanical or centrifugal filtration, depending on specific injection well geology. Mechanical filtration can utilize a mechanical filter, which can be obtained from HY-PRO FILTRATION. Centrifugal filtration or separation can be performed using equipment available from DOLPHIN CENTRIFUGE. In some instances, solids (e.g., biochar, wood, etc.) can be ground to fine particle sizes (e.g., diameters less than 10 mm, less than 5 mm, or less than 1 mm), to ensure that any solids present in the injection material 508 do not clog pipes or pores during the injection process.

Underground Injection

There are several types of injection wells in the United States and in other countries that are candidates for carbon-containing liquid injection (e.g., the injection material 508). Carbon-containing liquid that has significant particulate content and/or is considered to be unstable may be best injected into a salt cavern as part of a slurry or dispersion (e.g., a liquid having suspended solid or liquid particles). In the United States, these types of wells can be considered EPA Class V injection wells. In such scenarios, excess biochar may be added to the slurry to increase its carbon content and/or to encourage polymerization. Advantageously, while polymerization is often perceived as having negative consequences, in some instances, polymerization can help stabilize salt caverns and/or other types of underground wells. Permanently coagulating the carbon-containing liquid (e.g., via polymerization) can reduce the risk of sink holes or other instabilities associated with the wells. Carbon-containing liquids can be analyzed prior to injection to ensure immiscibility with a brine solution and no interaction with salt formations of cavern walls.

According to one embodiment, carbon-containing liquids that have lower particulate contents, are miscible with brine, and/or interact with salt cavern walls may be more suitable for injection into deep porous rock formations (e.g., rather than salt caverns). In the United States, these types of wells can be classified as EPA regulated deep underground injection wells, such as Class I disposal wells. These wells can be used across the United States to safely receive millions of gallons of nonhazardous waste annually. Glycerol is one example of a carbon-containing liquid that is suitable for a Class I well, due to glycerol's miscibility with brine solutions found in Class V salt caverns.

Figure 6:
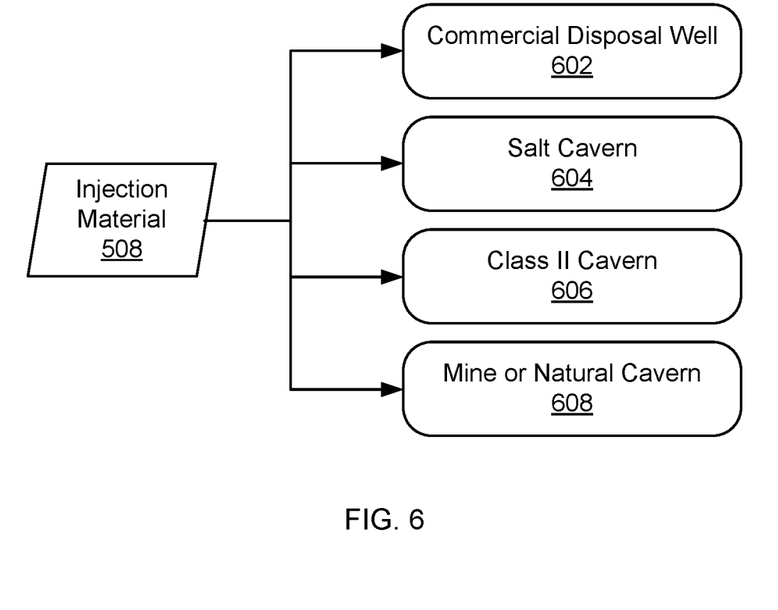
FIG. 6 is a schematic diagram of a process for injecting carbon-containing materials into one or more underground wells, in accordance with certain embodiments.

Referring to FIG. 6, the injection material 508 and/or other carbon-containing liquids or materials can be injected into a variety of underground injection wells. In various examples, one suitable type of underground injection well is a commercial disposal well 602, such as MID-WAY ENVIRONMENTAL's Class I injection well outside Davenport, Okla. There are other Class I injection wells (e.g., associated with Class V wells) suitable for emplacement of displaced brine solution, such as a facility previously used for natural gas storage, near Hutchinson, Kans.

Additionally or alternatively, in some instances, a suitable type of underground injection well is a salt cavern 604, such as the salt caverns operated by Underground Cavern Stabilization, LLC in a former EMPIRE GAS propane storage field, near Crupper's Corner, Kans. Other examples of appropriate salt caverns are operated by ONEOK, near Hutchinson, Kans.

In certain examples, a suitable type of underground injection well is a Class II cavern 606 that was previously used for oil and gas. Care should be taken to ensure material and geological compatibility with the injected materials and/or to prevent leakage through any open well-heads that may have been previously used and/or abandoned. In some examples, Class II caverns 606 may be used with the systems and methods described herein in conjunction with enhanced oil recovery. For example, carbon-containing liquids (e.g., the injection material 508) can be injected into an underground well in an effort to improve recovery of oil from the well.

Additionally or alternatively, depleted, abandoned, or purpose-constructed mines and/or natural caverns can be excellent candidates for the underground injection wells described herein. Solution mining operations and mechanical mining can produce enormous caverns that can, with minimal effort compared to new construction, be used as emplacement or injection facilities. Preparation of such caverns for injection can involve, for example, sealing ventilation shafts, installing bulkheads, and performing a suite of integrity testing to ensure both chemical compatibility as well as formation suitability for the injected materials. In the case of depleted solution mining, the conversion to a suitable injection facility may be as simple as a permitting change, given that geological differences between a class V well and a solution mining cavern can be minimal.

Figure 7:
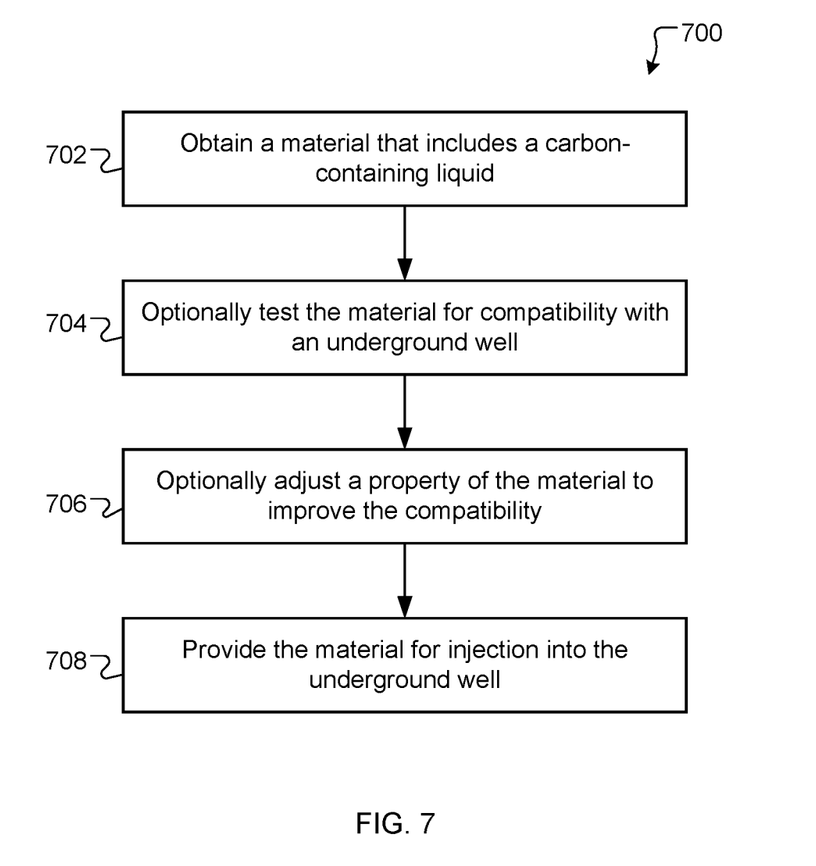
FIG. 7 is a flowchart of a method of sequestering carbon-containing materials in an underground well, in accordance with certain embodiments.

FIG. 7 is a flowchart of an example method 700 of sequestering carbon-containing materials. A material that includes a carbon-containing liquid is obtained (step 702). The material is optionally tested (step 704) for compatibility with an underground well. A property of the material is optionally adjusted (step 706) to improve the compatibility. The material is provided (step 708) for injection into the underground well. Injection operation hardware can include, but is not limited to, storage and blending tanks or containers, pumps, mechanical filtration devices, process piping, thermal conditioning equipment, sensors, and/or control hardware.

Examples

Configuration 1

A carbon-containing liquid (e.g., including bio-oil, glycerol, biodiesel, ethanol, used cooking oils, vegetable oil, other plant-based oils, a solution containing microbes or algae, biocrude, biocrude byproducts, petroleum, crude oil, gasoline, kerosene, diesel, or any combination thereof) can be obtained or purchased from a supplier. The carbon-containing liquid can be tested for compatibility and applicability for injection, to confirm the liquid passes compatibility criteria for one of the well options. The carbon-containing liquid can be transported to a facility near or above the appropriate type of well and injected into the well.

Configuration 2

A biomass can be collected in a variety of forms and from a variety of locations, such as, for example: agricultural waste from a farm or secondary processing facility (e.g., corn stover from a farm, almond shells from a shelling facility, or kelp from a kelp farm), forestry residue from thinning or fire mitigation operations, and/or sawdust, pulp, cooked bagasse, or other byproducts obtained from a factory, mill, or chemical plant. The biomass can be dried and ground as needed to produce a fine particulate (e.g., average particle sizes of 0.5 mm to 5 mm) having a low moisture content (e.g., less than 15%). The biomass can be injected into a pyrolysis system (e.g., including a fluidized bed pyrolysis reactor provided by MAINSTREAM ENGINEERING, a fast pyrolysis or RTP® process provided by ENSYN, an EMPYRO process provided by BTG, or the present fast pyrolysis process) to produce a pyrolysis bio-oil and/or biochar. Measurements can be taken to determine the corrosivity, viscosity, and flash point of the bio-oil using standard procedures and apparatuses. The bio-oil can be tested for compatibility and applicability for injection, to confirm that the bio-oil passes compatibility criteria for one of the well options. pH, viscosity, specific gravity, microbial growth potential, solids loading, and/or flash point can be adjusted as needed, for example, by blending the bio-oil with another material to meet the compatibility requirements of one of the well options. The bio-oil and/or biochar can be injected into an injection well.

Configuration 3

A carbon-containing liquid (e.g., including bio-oil, glycerol, biodiesel, ethanol, used cooking oils, vegetable oil, other plant-based oils, a solution containing microbes or algae, biocrude, biocrude byproducts, petroleum, crude oil, gasoline, kerosene, diesel, or any combination thereof) can be obtained or purchased from a supplier. The liquid can be tested for compatibility and applicability for emplacement, and a determination can be made that the liquid does not meet some of the requirements of the well. Properties such as pH, viscosity, specific gravity, microbial growth potential, solids loading, and/or flash point can be adjusted as needed, for example, by filtering the liquid and/or blending the liquid with another material to meet the requirements of one of the well options. The adjusted carbon-containing liquid can be injected into the appropriate well.

Configuration 4

A biomass can be collected in a variety of forms and from a variety of locations, such as, for example: agricultural waste from a farm or secondary processing facility (e.g., corn stover from a farm or almond shells from a shelling facility), forestry residue from thinning or fire mitigation operations, and/or sawdust, pulp, cooked bagasse, or other byproducts obtained from a factory, mill, or chemical plant. The biomass can be ground as needed to produce a fine particulate (e.g., average particle sizes of 0.5 mm to 5 mm). The biomass can be injected into a hydrothermal liquefaction unit (e.g., provided or used by GENIFUEL, STEEPER ENERGY, or CHARM INDUSTRIAL, or a catalytic hydrothermal reactor provided by LICELLA) to produce biocrude, an aqueous byproduct, and a solid byproduct. Measurements can be taken to determine the corrosivity, viscosity, and flash point of the biocrude using standard procedures and apparatuses. The biocrude can be tested for compatibility and applicability for injection, to confirm that the biocrude passes compatibility criteria for one of the well options. pH, viscosity, specific gravity, microbial growth potential, solids loading, and/or flash point can be adjusted as needed, for example, by blending the biocrude with another material to meet the compatibility requirements of one of the well options. The biocrude, the aqueous byproduct, and/or the hydrochar byproduct can be injected into an injection well.

Configuration 5

A biogenic material in the form of vegetable oil, other plant-based oils, used cooking oil, animal fats, other fats, fatty acids, lipids, or any combination thereof, can be obtained or purchased from a supplier. The biogenic material is reacted with one or more alcohols (e.g., ethanol or methanol) in a transesterification process in the presence of a catalyst to produce biodiesel and crude glycerol. Measurements are taken to determine the corrosivity, viscosity, and/or flash point of the biodiesel and/or glycerol using standard procedures and apparatuses. The biodiesel and/or glycerol can be tested for compatibility and applicability for injection, to confirm the biodiesel and/or glycerol pass compatibility criteria for one of the well options. pH, viscosity, specific gravity, microbial growth potential, and/or flash point can be adjusted as needed, for example, by blending the biodiesel and/or glycerol with another material to meet the compatibility requirements of one of the well options. The glycerol and/or biodiesel can be injected into an injection well.

Configuration 6

Corn grain, sugar beets, other direct biogenic sugars, or cellulosic biomass-derived sugars can be obtained or purchased from a supplier. The sugars can be used in a fermentation process to produce a dilute ethanol product. Measurements can be taken to determine the corrosivity, viscosity, and/or and flash point of the ethanol product using standard procedures and apparatuses. The ethanol product can be tested for compatibility and applicability for emplacement, to confirm the ethanol product passes compatibility criteria for one of the well options. pH, viscosity, specific gravity, microbial growth potential, and/or flash point can be adjusted as needed, for example, by blending the ethanol product with another material to meet the compatibility requirements of one of the well options. The ethanol product can be injected into an injection well.

Configuration 7

A carbon-containing liquid (e.g., including bio-oil, glycerol, biodiesel, ethanol, used cooking oils, vegetable oil, other plant-based oils, a solution containing microbes or algae, biocrude, biocrude byproducts, petroleum, crude oil, gasoline, kerosene, diesel, or any combination thereof) can be obtained or purchased from a supplier. The liquid can be tested for compatibility and applicability for injection, to determine if the liquid passes the compatibility criteria for one of the well options. Modifications to the liquid can be made, as needed, to improve the compatibility. The liquid can be transported to a facility for injection into an appropriate type of well, for purposes of enhanced oil recovery and/or geologic carbon sequestration.

Particular embodiments of the subject matter have been described. Other embodiments are within the scope of the present disclosure. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. [0023] The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A method of sequestering carbon-containing materials, the method comprising:
    obtaining a material comprising a carbon-containing liquid,
        wherein the material has been subjected to a test for compatibility with an underground well,
        wherein the test for compatibility comprises using a core sample for the underground well to determine a tendency for at least one of premature polymerization, auto-polymerization, phase separation, gas generation, or precipitation of solids,
        wherein a property of the material has been adjusted to improve the compatibility with the underground well, and
        wherein the carbon-containing liquid comprises at least one of bio-oil, biocrude, or glycerol; and
    providing the material for injection into the underground well.

2. The method of claim 1, wherein the carbon-containing liquid further comprises at least one of biodiesel, ethanol, cooking oil, vegetable oil, plant-based oil, a solution containing microbes or algae, a biomass dispersion, a biocrude byproduct, petroleum, crude oil, gasoline, or diesel.

3. The method of claim 1, wherein the carbon-containing liquid comprises the bio-oil, wherein the bio-oil is derived from pyrolysis of a biomass, and wherein the biomass comprises at least one of agricultural waste, forestry residue, wood chips, sawdust, pulp, corn stover, or bagasse.

4. The method of claim 1, wherein the carbon-containing liquid comprises the biocrude, wherein the biocrude is derived from hydrothermal liquefaction of a biomass, and wherein the biomass comprises at least one of agricultural waste, forestry residue, wood chips, sawdust, pulp, corn stover, bagasse, kelp, algae, food waste, human waste, or animal waste.

5. The method of claim 1, wherein the carbon-containing liquid comprises at least one of the glycerol or biodiesel, wherein the at least one of the glycerol or the biodiesel is derived from transesterification of at least one of vegetable oil, cooking oil, or animal fat.

6. The method of claim 1, wherein the carbon-containing liquid further comprises ethanol derived from fermentation of at least one of biogenic sugars or cellulosic biomass-derived sugars.

7. The method of claim 1, wherein the carbon-containing liquid further comprises a dispersion of biomass particles, and wherein the biomass particles comprise at least one of agricultural waste, forestry waste, soil, processed waste, algae, microbes, kelp, human waste, or animal waste.

8. The method of claim 1, wherein the underground well comprises at least one of a commercial disposal well, a salt cavern, a Class II cavern, a depleted mine, an abandoned mine, a purpose-constructed mine, or a natural cavern.

9. The method of claim 1, wherein the test comprises measuring at least one of pH, viscosity, specific gravity, microbial growth potential, solids loading, tendency to auto-polymerize, or flash point.

10. The method of claim 1, wherein the property comprises at least one of pH, viscosity, specific gravity, microbial growth potential, solids loading, tendency to auto-polymerize, or flash point.

11. The method of claim 1, wherein the property was adjusted by at least one of filtering the material or blending the material with a different material.

12. A system for sequestering carbon-containing materials, the system comprising:
    a source for a material comprising a carbon-containing liquid,
        wherein the material has been subjected to a test for compatibility with an underground well,
        wherein the test for compatibility comprises using a core sample for the underground well to determine a tendency for at least one of premature polymerization, auto-polymerization, phase separation, gas generation, or precipitation of solids, and
        wherein the carbon-containing liquid comprises at least one of bio-oil, biocrude, or glycerol;
    at least one of a blender or a filter for adjusting a property of the material to improve the compatibility with the underground well; and
    at least one of a container, a pump, or a pipe for injecting the material into the underground well.

13. The system of claim 12, wherein the carbon-containing liquid further comprises at least one of biodiesel, ethanol, cooking oil, vegetable oil, plant-based oil, a solution containing microbes or algae, a biomass dispersion, a biocrude byproduct, petroleum, crude oil, gasoline, or diesel.

14. The system of claim 12, wherein the carbon-containing liquid comprises the bio-oil, wherein the bio-oil is derived from pyrolysis of a biomass, and wherein the biomass comprises at least one of agricultural waste, forestry residue, wood chips, sawdust, pulp, corn stover, or bagasse.

15. The system of claim 12, wherein the carbon-containing liquid comprises the biocrude, wherein the biocrude is derived from hydrothermal liquefaction of a biomass, and wherein the biomass comprises at least one of agricultural waste, forestry residue, wood chips, sawdust, pulp, corn stover, bagasse, kelp, algae, food waste, human waste, or animal waste.

16. The system of claim 12, wherein the carbon-containing liquid comprises at least one of the glycerol or biodiesel, wherein the at least one of the glycerol or the biodiesel is derived from transesterification of at least one of vegetable oil, cooking oil, or animal fat.

17. The system of claim 12, wherein the carbon-containing liquid further comprises ethanol derived from fermentation of at least one of biogenic sugars or cellulosic biomass-derived sugars.

18. The system of claim 12, wherein the carbon-containing liquid further comprises a dispersion of biomass particles, and wherein the biomass particles comprise at least one of agricultural waste, forestry waste, soil, processed waste, algae, microbes, kelp, human waste, or animal waste.

19. The system of claim 12, wherein the underground well comprises at least one of a commercial disposal well, a salt cavern, a Class II cavern, a depleted mine, an abandoned mine, a purpose-constructed mine, or a natural cavern.

20. The system of claim 12, further comprising at least one measurement device for performing the test.

* * * * *